(12) United States Patent
Grace et al.

(10) Patent No.: US 7,444,080 B1
(45) Date of Patent: Oct. 28, 2008

(54) IRDA/RC TRANSMITTER CIRCUIT HAVING LOW ENERGY CONSUMPTION

(75) Inventors: Alan Grace, South San Francisco, CA (US); Manuel Aceves, Sunnyvale, CA (US)

(73) Assignee: ZiLOG, Inc., San Jose, CA (US)

( * ) Notice: Subject to any disclaimer, the term of this patent is extended or adjusted under 35 U.S.C. 154(b) by 728 days.

(21) Appl. No.: 10/996,506

(22) Filed: Nov. 22, 2004

(51) Int. Cl.
*H04B 10/04* (2006.01)
*H04B 10/10* (2006.01)
*H04B 10/06* (2006.01)

(52) U.S. Cl. ............................ 398/128; 398/183
(58) Field of Classification Search ............ None
See application file for complete search history.

(56) References Cited

U.S. PATENT DOCUMENTS

| | | | | |
|---|---|---|---|---|
| 2,381,768 A | * | 8/1945 | Minneci | 323/340 |
| 3,011,095 A | * | 11/1961 | Kriechbaum | 315/299 |
| 5,287,372 A | * | 2/1994 | Ortiz | 372/38.07 |
| 5,477,113 A | * | 12/1995 | Christoffersson | 315/278 |
| 5,736,881 A | * | 4/1998 | Ortiz | 327/175 |
| 6,411,045 B1 | * | 6/2002 | Nerone | 315/291 |
| 6,563,269 B2 | * | 5/2003 | Robinett et al. | 315/86 |
| 7,029,145 B2 | * | 4/2006 | Frederick | 362/234 |
| 2003/0016711 A1 | * | 1/2003 | Crawford | 372/38.02 |
| 2005/0057169 A1 | * | 3/2005 | Noguchi et al. | 315/150 |
| 2005/0185962 A1 | * | 8/2005 | Grace | 398/135 |

* cited by examiner

*Primary Examiner*—Kenneth Vanderpuye
*Assistant Examiner*—David S Kim
(74) *Attorney, Agent, or Firm*—Imperium Patent Works; T. Lester Wallace; Darien K. Wallace

(57) ABSTRACT

An IrDA module is coupled to a tapped inductor and makes both IrDA and remote control (RC) transmissions. The IrDA module includes a transmitter LED and a field effect transistor (FET) switch. The inductor has a first lead, a second lead and a tap. The first lead is coupled to a battery voltage, and the tap is coupled through a resistor to the LED anode. The drain of the FET switch is coupled to both the LED cathode and the second lead of the inductor. The location of the tap on the inductor is chosen such that the voltage drop across the LED when the FET switch is turned on and before the inductor saturates results in a desired IrDA LED drive current without using current-limiting resistors that can dissipate power. After the inductor saturates, the voltage drop across the LED results in a larger RC LED drive current.

14 Claims, 6 Drawing Sheets

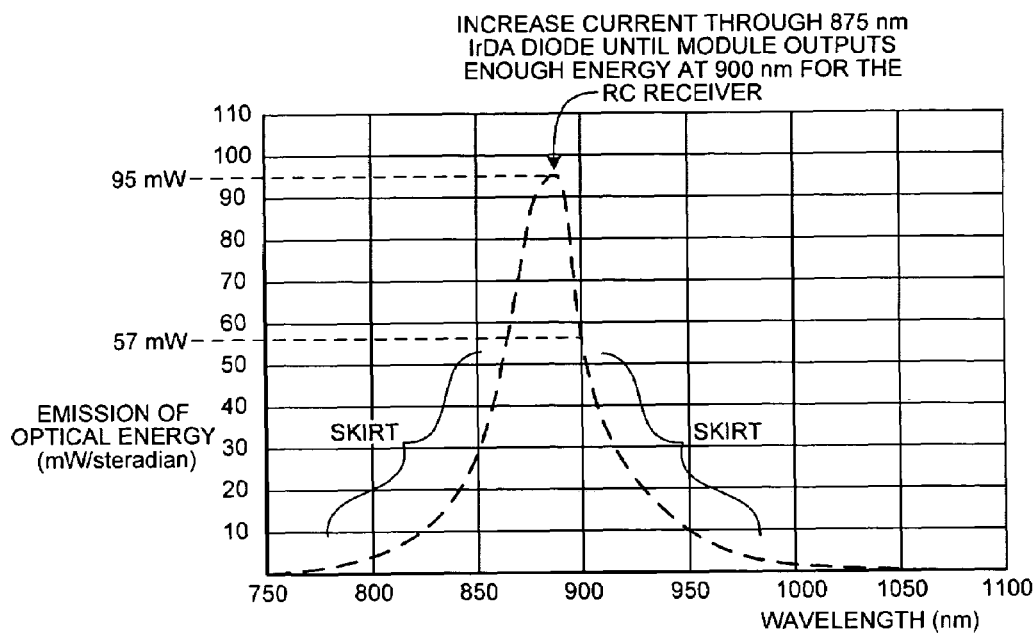
FIG. 3
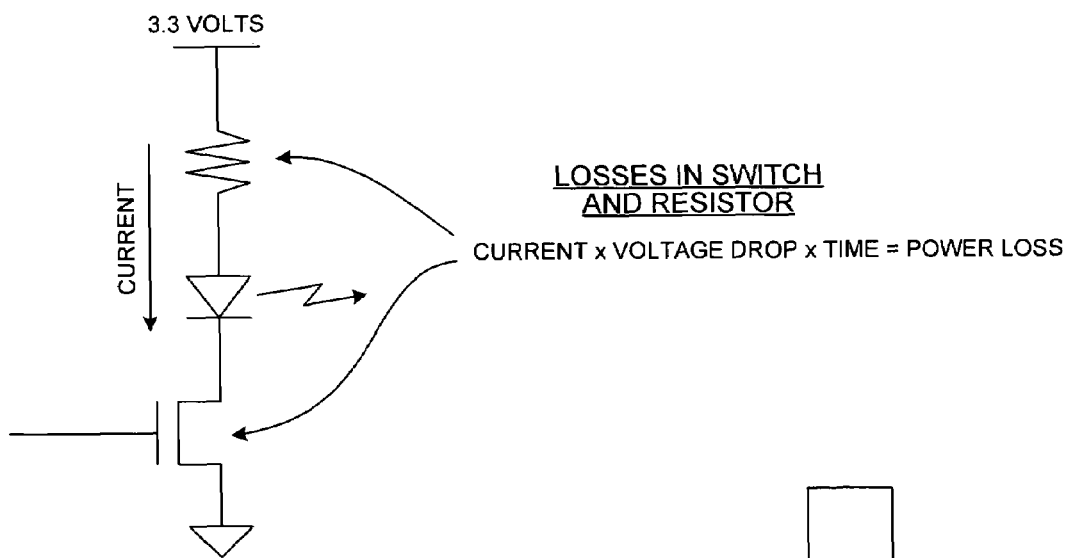
FIG. 4
FIG. 5

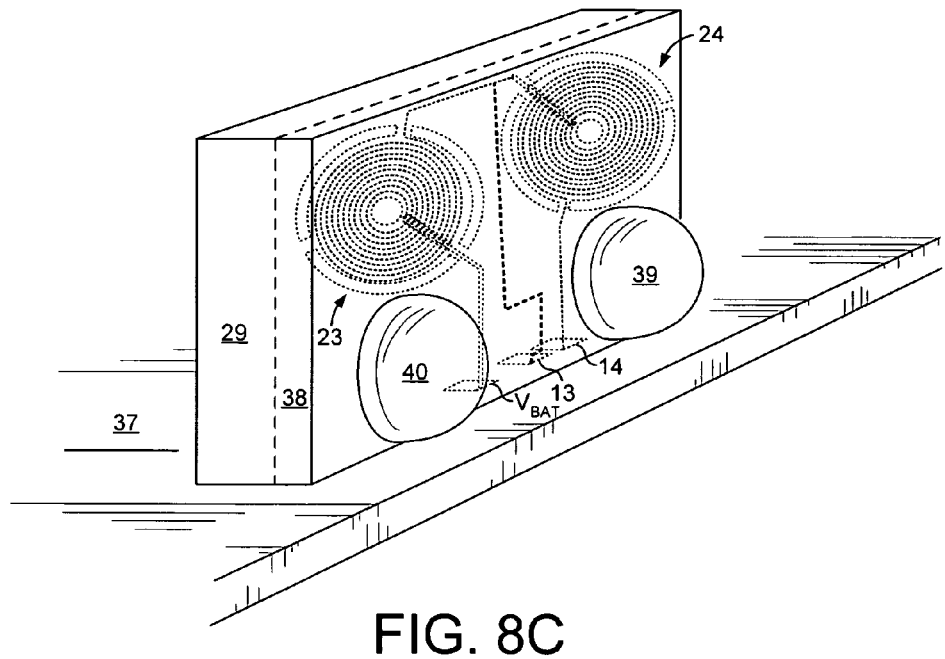
FIG. 8C
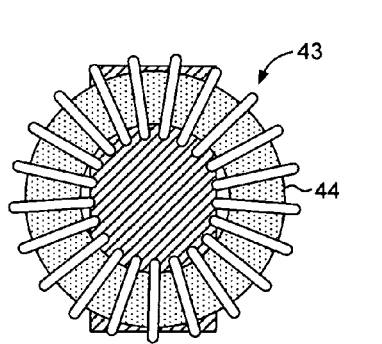 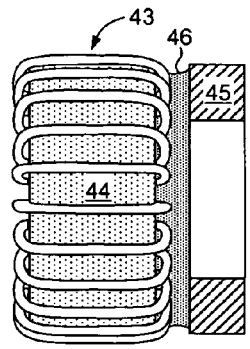 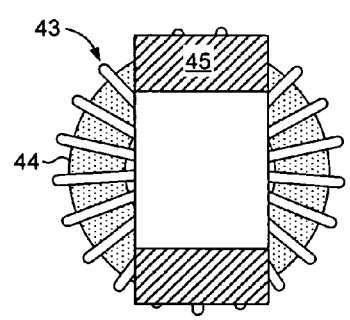
FIG. 9A　　　FIG. 9B　　　FIG. 9C

IRDA/RC TRANSMITTER CIRCUIT HAVING LOW ENERGY CONSUMPTION

TECHNICAL FIELD

The present invention relates generally to infrared transceivers and, more specifically, to a combined transceiver for both IrDA signals and remote control infrared signals.

BACKGROUND

FIG. 1 is a diagram of a circuit set forth in U.S. patent application Ser. No. 10/788,180, filed on Feb. 25, 2004 (the subject matter of which is incorporated herein by reference). In the circuit, a transmitter LED within an IrDA (Infrared Data Association) module is used both to make IrDA transmissions and to make remote control (RC) transmissions. Although IrDA uses an infrared signal of approximately 875 nm and RC remote control devices use an infrared signal of approximately 960 nm, the IrDA transmitter LED actually transmits over a range of wavelengths. By increasing the transmission power of the IrDA LED, the amount of energy transmitted at 960 nm can be made sufficiently large that the IrDA transmitter LED can be used in an RC transmitter mode to make RC transmissions to an RC receiver.

FIG. 2 is a diagram that shows the wavelengths transmitted by the 875 nm IrDA LED. Note that the curve of the IrDA transmitter LED overlaps the response curve of the RC receiver.

FIG. 3 is a diagram that shows how the current through the IrDA 875 nm transmitter diode is increased in the RC transmitter mode until the IrDA module outputs enough energy at 900 nm for RC receiver operation.

The circuit of FIG. 1 works by taking advantage of the fact that RC signals are transmitted with longer bursts of IR energy (approximately 10 microseconds), whereas the IrDA signals are transmitted with shorter bursts of IR energy (approximately 1.6 microseconds). During a short IrDA pulse, an inductor L in the current limiting circuit of FIG. 1 is not conducting a significant amount of current. Current flow through the current limiting circuit is limited by the current limiting resistor R1 in the left leg of the current limiting circuit. The value of R1 is chosen to limit the current flow into the LED to a relatively low current level suitable for the IrDA transmission.

During a relatively longer RC pulse, the inductor L of the current limiting circuit of FIG. 1 conducts increasingly more current. A magnetic field builds up in the inductor until the core of the inductor saturates. When the inductor L saturates, current flow through the current limiting circuit is limited by the equivalent resistance of R1 in parallel with the current limiting resistor R2 in the right leg of the current limiting circuit. This peak amount of current is the current flow into the LED. The value of R2 is chosen to limit the current flow into the LED to the higher current required for the RC transmission.

The circuit of FIG. 1 may be used in personal digital assistants (PDAs). In a PDA, battery life is often a very important design consideration. Being able to extend battery life is very valuable. A technique is sought whereby power consumption can be reduced. In both the IrDA mode and the RC mode, current is being limited by a resistance, and the current flow across the resistance dissipates energy.

FIG. 4 is a simplified diagram of the IrDA LED circuit. The diagram illustrates power losses in the current flow across the current limiting resistance and across the on-resistance of the field effect transistor (FET) of the IrDA module. It would be desirable to reduce these losses.

SUMMARY

An IrDA/RC transceiver module includes a transmitter LED and a field effect transistor (FET) switch and is coupled to a tapped inductor. The IrDA/RC transceiver makes both IrDA transmissions and remote control (RC) transmissions. The tapped inductor has a first lead, a second lead and a tap. The first lead is coupled to a battery voltage, and the tap is coupled to the anode of the LED. The drain of the FET switch is coupled to both the cathode of the LED and the second lead of the inductor.

The tapped inductor acts as a voltage divider when the FET switch is turned on and before the inductor saturates. The location of the tap on the inductor is chosen such that the voltage drop across the LED results in a desired IrDA LED drive current before the inductor saturates. The desired IrDA LED drive current is provided to the LED without using current-limiting resistors that dissipate power. Less power is consumed in the IrDA mode by the IrDA/RC transceiver and the tapped inductor than by an IrDA/RC transceiver coupled to current limiting resistors that dissipate power.

A larger RC LED drive current is produced by allowing the FET switch to remain on after the inductor saturates and no longer acts as a voltage divider. After the inductor saturates, the battery voltage is provided to the LED, and a larger voltage drop across the LED results in the larger RC LED drive current.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 3 is a graph of the optical emission energy at various wavelengths for the combined IrDA/RC transceiver of FIG. 1.

FIG. 4 is a simplified diagram of the IrDA LED circuit illustrating power losses.

FIG. 5 illustrates a 1.6-microsecond IrDA pulse.

FIG. 8C is a perspective view of IrDA/RC transceiver 10 and tapped inductor 12 of FIG. 8A.

FIGS. 9A-C are side and back views of a tapped inductor that is a continuous toroidal coil.

DETAILED DESCRIPTION

Reference will now be made in detail to some embodiments of the invention, examples of which are illustrated in the accompanying drawings.

Figure 6:
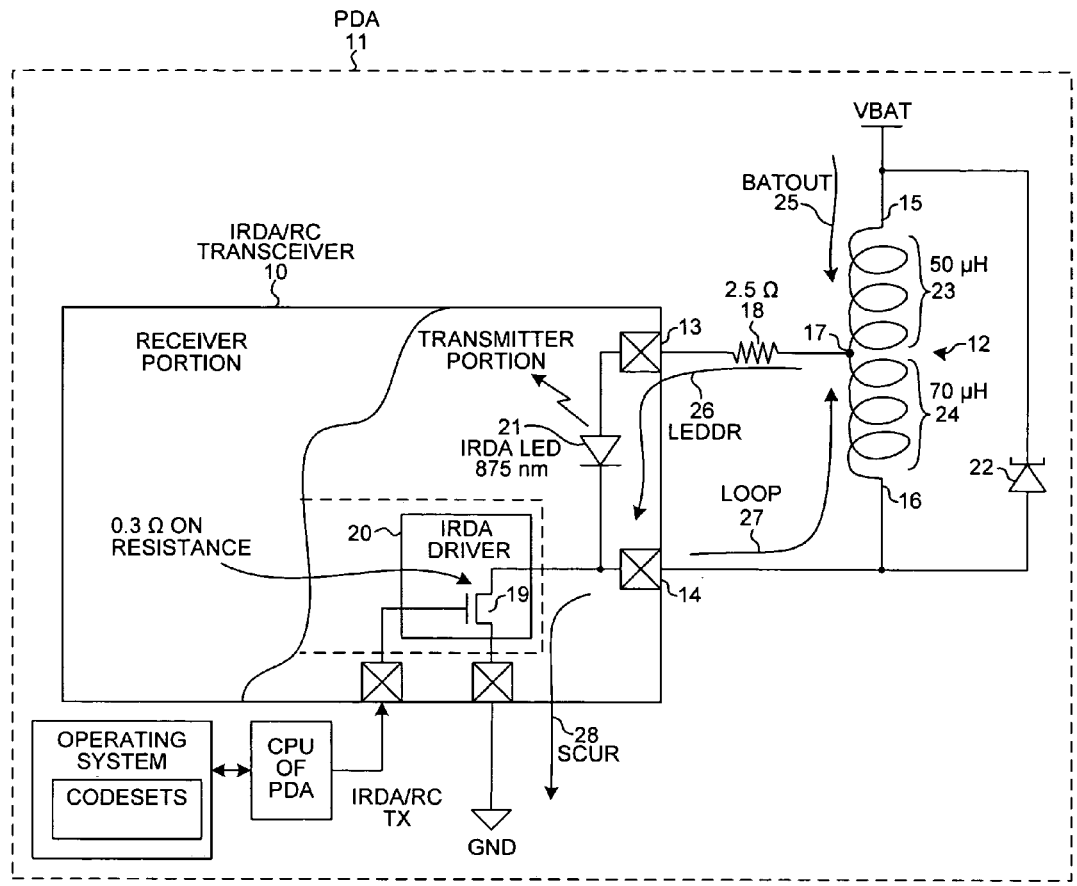
FIG. 6 is a simplified block diagram of a combined IrDA/RC transceiver with a tapped inductor in accordance with one embodiment of the invention.

FIG. 6 is a diagram of a combined IrDA/RC transceiver 10 in accordance with an embodiment of the present invention. IrDA/RC transceiver 10 is part of a PDA 11 and is powered by a battery voltage VBAT. A tapped inductor 12 is connected between a battery voltage (VBAT) and IrDA/RC transceiver 10. Tapped inductor 12 is coupled to IrDA/RC transceiver 10 via a first terminal 13 and a second terminal 14. Tapped inductor 12 has a first lead 15, a second lead 16 and a tap 17. First lead 15 is coupled to a terminal for the battery voltage (VBAT), and second lead 16 is coupled to second terminal 14. Tap 17 is coupled through a resistor 18 to first terminal 13. IrDA/RC transceiver 10 includes a field effect transistor (FET) switch 19 within an IrDA driver portion 20. The drain of FET switch 19 is coupled through second terminal 14 to second lead 16 of inductor 12. The drain of FET switch 19 is also coupled to the cathode of an IrDA LED 21 within IrDA/RC transceiver 10. Second lead 16 of inductor 12 is coupled through an overshoot diode 22 to first lead 15 of inductor 12. Tap 17 of inductor 12 is coupled through resistor 18 and first terminal 13 to the anode of IrDA LED 21. The location of tap 17 on the coil of inductor 12 is chosen such that the voltage drop across IrDA LED 21 (when FET switch 19 is on and conducting current) results in the desired IrDA LED drive current. Tap 17 divides inductor 12 into a first part 23 and a second part 24.

FIG. 6 also shows four currents: a battery out current (BATOUT) 25, an LED drive current (LEDDR) 26, a loop current (LOOP) 27 and a switch current (SCUR) 28.

Figure 7:
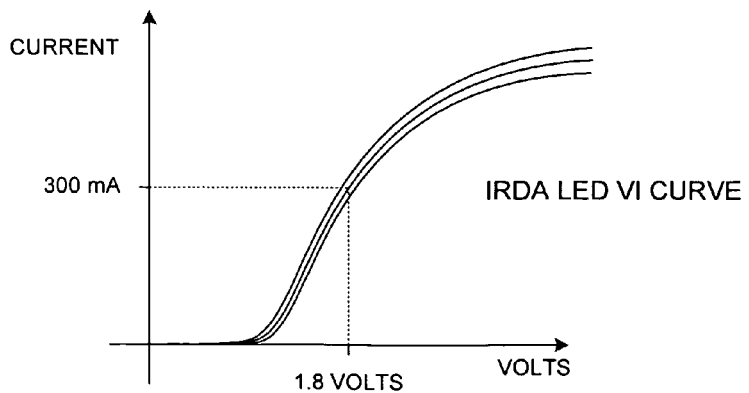
FIG. 7 is a simplified diagram of the characteristic voltage versus current curves of several IrDA LEDs.

FIG. 7 is a simplified diagram of the characteristic voltage versus current curves of several IrDA LEDs. The characteristic curves are very similar to one another. A voltage drop of about 1.8 volts across IrDA LED 21 is used to achieve an LED drive current of about 300 milliamperes.

As current begins to flow through inductor 12 at the beginning of an IrDA burst when FET switch 19 is turned on, tap 17 on inductor 12 acts as a voltage divider. Resistor 18 acts to increase reflected impedance. Tap 17 is placed on inductor 12 so that a sufficient voltage is present on first terminal 13 to allow about 1.8 volts to be dropped across IrDA LED 21 when FET switch 19 is turned on. The location of tap 17 on inductor 12 is empirically determined to achieve a desired LED drive current for a specific configuration of battery voltage and LED type. For example, where the battery voltage (VBAT) is 3.3 volts, tap 17 can be placed on inductor 12 such that a voltage of about two volts is present on first terminal 13. As a consequence, an average of about 300 mA of LED drive current flows across IrDA LED 21 and results in an additional voltage drop of about 1.8 volts. The remaining voltage drop occurs across FET switch 19.

In another embodiment, the location of the tap on the inductor is chosen such that the voltage drop across IrDA LED 21 when FET switch 19 is turned on and before inductor 12 saturates results in other desired average IrDA LED drive currents, such as about 195 mA or about 209 mA. After inductor 12 saturates and no longer acts as a voltage divider, the voltage drop across IrDA LED 21 increases and results in a larger RC LED drive current, such as about 400 mA.

Figure 1:
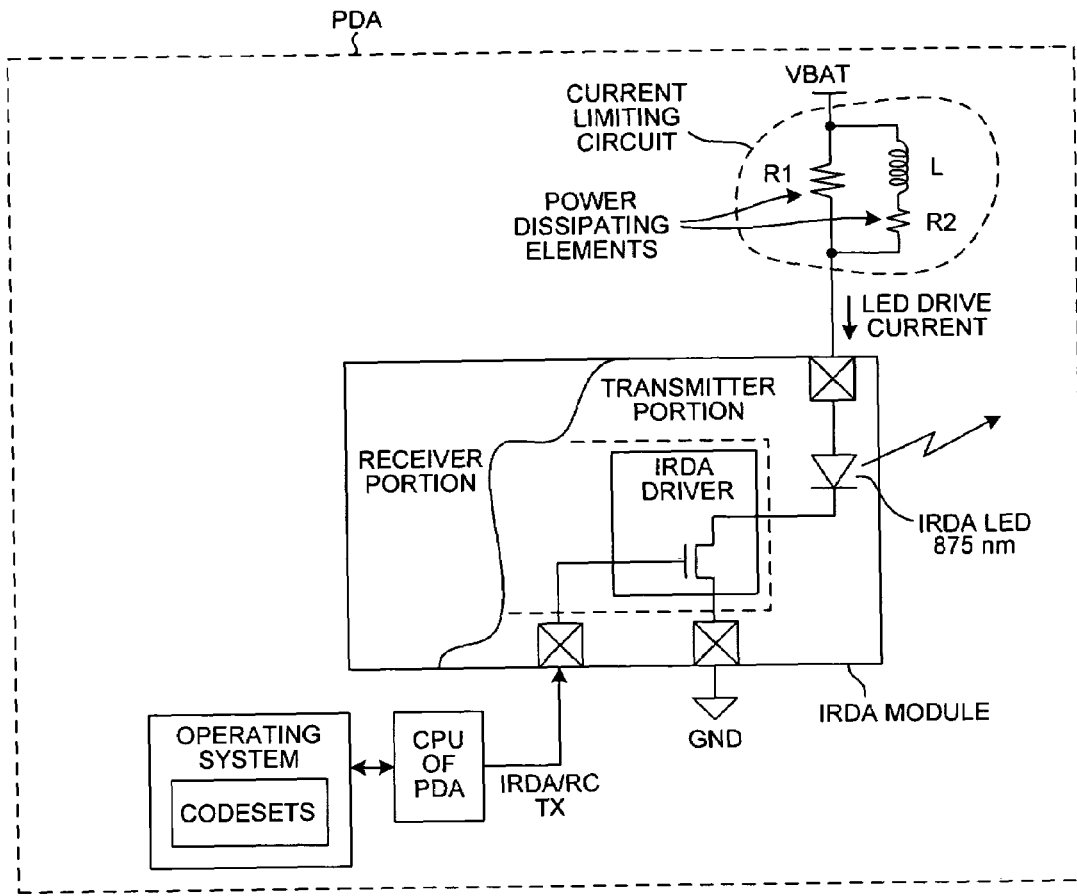
FIG. 1 is a simplified block diagram of a PDA with a transceiver for both IrDA signals and remote control infrared signals.
Figure 2:
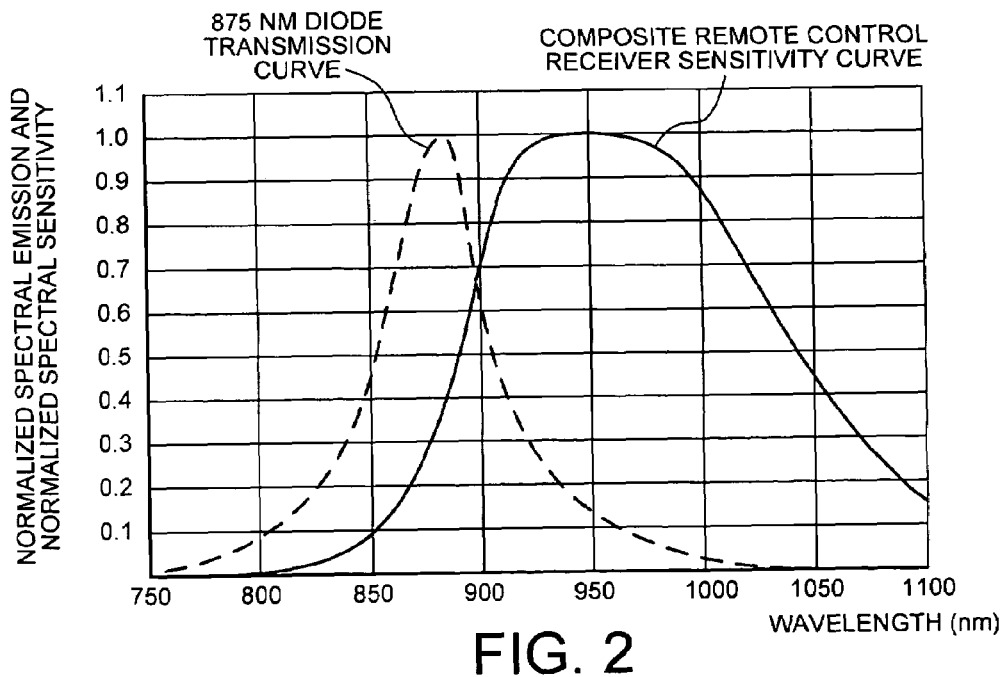
FIG. 2 is a graph showing transmission power at various wavelengths for the combined IrDA/RC transceiver of FIG. 1.

Powering IrDA LED 21 from tapped inductor 12 allows IrDA/RC transceiver 10 to be used without the current limiting circuit of FIG. 1. Without the current limiting resistors R1 and R2, the circuit of FIG. 6 dissipates less power in the IrDA mode, and battery life is extended.

Figure 8A:
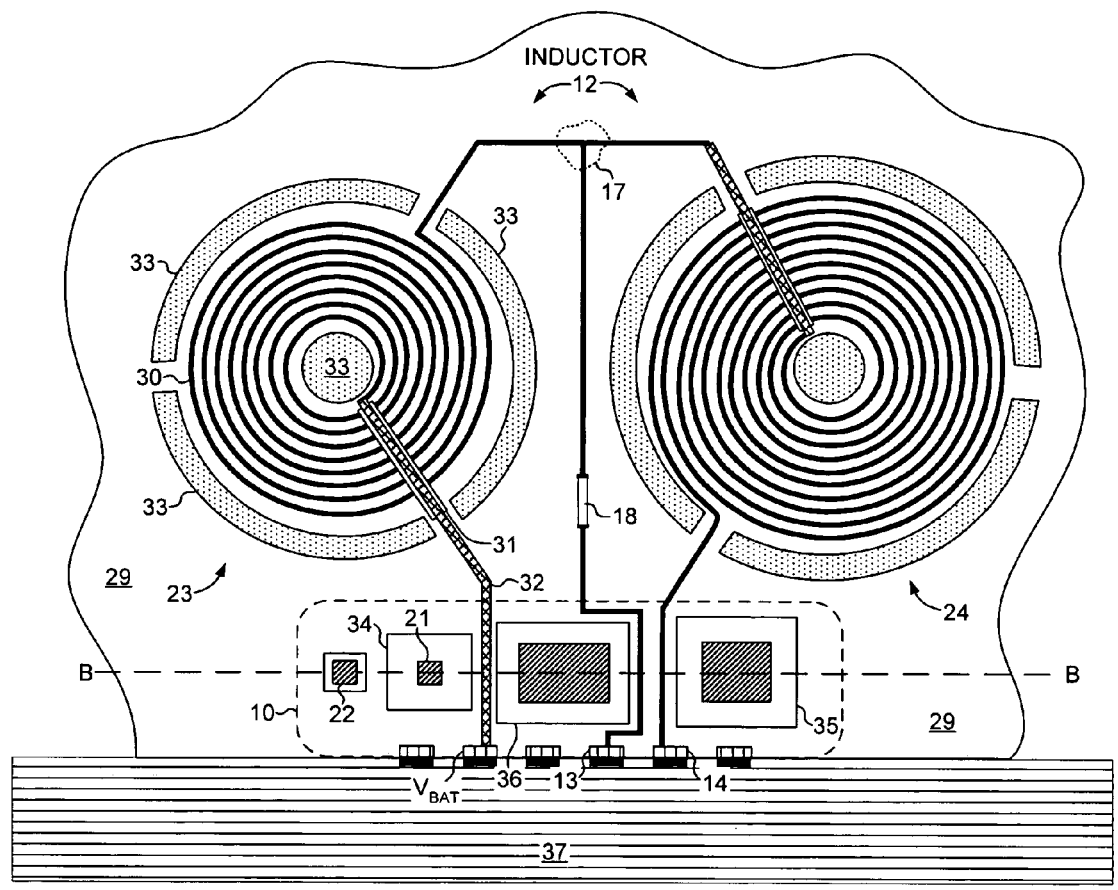
FIG. 8A is a top-down cross-sectional view of a combined IrDA/RC transceiver with a tapped inductor formed as two spiral traces.

FIG. 8A shows yet another embodiment in which first part 23 and second part 24 of inductor 12 are separated. First inductor part 23 is connected between battery voltage VBAT and tap 17, and second inductor part 24 is connected between tap 17 and second terminal 14. Each of first inductor part 23 and second inductor part 24 is a separate inductor coil that is formed as a spiral trace on a printed circuit board piece 29. Forming an inductor as a spiral trace on a printed circuit board is described in U.S. patent application Ser. No. 10/897,290, filed on Jul. 21, 2004 (the subject matter of which is incorporated herein by reference). The trace that forms inductor 12 can be a silver trace, for example. Resistor 18 can be formed as a conductive carbon patch that bridges a gap in a silver trace.

Although first inductor part 23 and second inductor part 24 are two separate spiral coils, as opposed to a continuous toroidal coil, first inductor part 23 and second inductor part 24 also act as a voltage divider when current begins to flow through them at the beginning of an IrDA burst. First inductor part 23 includes a spiral trace 30, an insulating trace 31 and an upper trace 32. After spiral trace 30 is printed on printed circuit board piece 29, insulating trace 31 is laid across all but the inner-most turn of spiral trace 30. Then, upper trace 32 is printed over insulating trace 31 such that upper trace 32 makes electrical contact only with the inner-most turn of spiral trace 30 and with a battery voltage terminal on printed circuit board piece 29. An "EI core" provides first inductor part 23 with a magnetic shell 33 that increases the inductance of inductor 12. Magnetic shell 33 is made of a ferrous material, such as powdered iron, nickel-zinc ferrite or manganese-zinc ferrite. Second inductor part 24 has an analogous structure to that of first inductor part 23. Second inductor part 24 has more turns in its spiral coil where second inductor part 24 has a larger inductance than does first inductor part 23.

FIG. 8A also shows the location of the components of IrDA/RC transceiver 10 on printed circuit board piece 29. The components of IrDA/RC transceiver 10 are not assembled in a separate transceiver module, but rather are mounted to the same printed circuit board piece 29 on which the spiral coils of inductor 12 have been traced. IrDA/RC transceiver 10 includes four dice: (i) an IrDA/RC transmitter diode die 34, (ii) an IR receiver PIN diode die 35, (iii) a controller die 36, and (iv) a die for overshoot diode 22. Overshoot diode 22 is connected on printed circuit board piece 29 to both second terminal 14 and the terminal for battery voltage (VBAT). IrDA/RC transmitter diode die 34 includes IrDA LED 21, which has a peak transmission at 875 nm. Printed circuit board piece 29 is mounted on edge onto a larger printed circuit board 37.

Figure 8B:
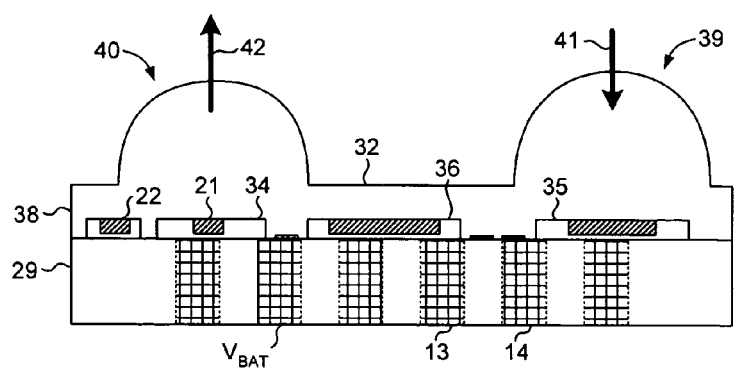
FIG. 8B is a side cross-sectional view of the IrDA/RC transceiver of FIG. 8A.

FIG. 8B is a side cross-sectional view of IrDA/RC transceiver 10 along the plane B-B of FIG. 8A. Molded plastic 38 covers printed circuit board piece 29 and the four dice and forms two semi-spherical lenses 39 and 40. Lens 39 focuses incoming IR radiation 41 onto PIN receiver diode die 35. Lens 40 redirects the radiation from IrDA LED 21 into a beam 42. Depending on the length of the pulse that generates the LED drive current, beam 42 carries IrDA transmissions or RC transmissions. FIG. 8B shows the outlines, behind plane B-B, of first terminal 13, second terminal 14 and the terminal for battery voltage (VBAT). The terminals of printed circuit board piece 29 are attached with solder paste to appropriately spaced matching terminals on larger printed circuit board 37.

FIG. 8C is a perspective view of IrDA/RC transceiver 10 and tapped inductor 12 of FIG. 8A. FIG. 8C shows printed circuit board piece 29 mounted on edge onto larger printed circuit board 37.

FIG. 9A is a side view in an embodiment in which inductor 12 is a continuous toroidal coil 43 that is tapped at one of the windings. Inductor 12 has a ferrite core 44. FIG. 9B is a side view of toroidal tapped inductor 12 showing an aluminum substrate 45 to which inductor 12 is attached. Inductor 12 is attached to aluminum substrate 45 with an epoxy glue 46. FIG. 9C is a back view of toroidal tapped inductor 12 showing aluminum substrate 45. In this embodiment, toroidal tapped inductor 12 is attached via aluminum substrate 45 to printed circuit board piece 29 on the opposite side from lenses 39 and 40.

Figure 10:
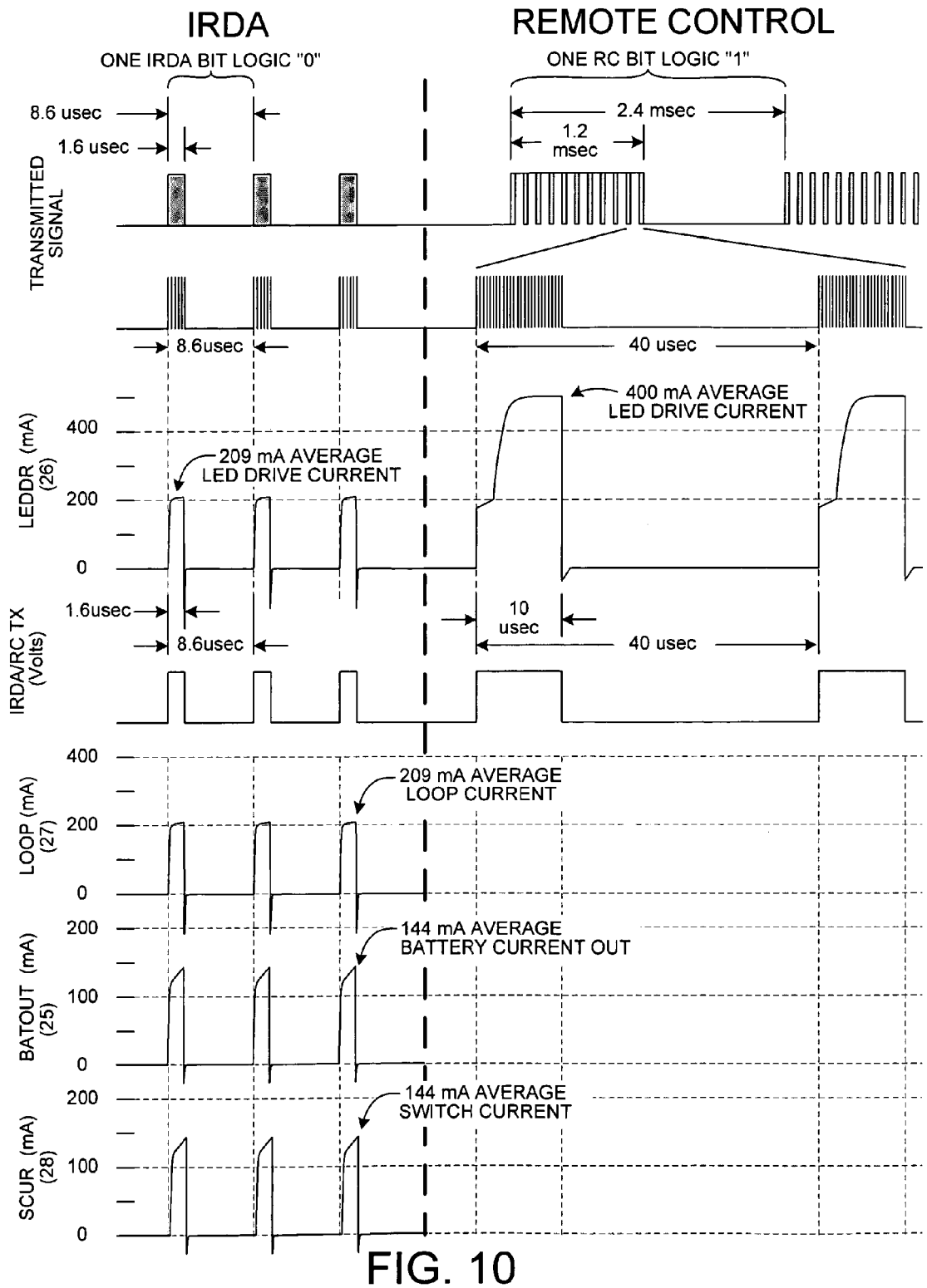
FIG. 10 is a waveform diagram illustrating the operation of the transceiver of FIG. 6 in both an IrDA mode and a remote control mode.

FIG. 10 is a waveform diagram that illustrates the operation of combined IrDA/RC transceiver 10 with tapped inductor 12 in both the IrDA mode and the remote control mode. The left half of FIG. 10 illustrates a typical IrDA transmission; the right half illustrates a typical remote control transmission. FIG. 10 shows current waveforms for battery out current (BATOUT) 25, LED drive current (LEDDR) 26, loop current (LOOP) 27 and switch current (SCUR) 28, as identified in FIG. 6. The waveforms correspond to the operation of an embodiment in which resistor 18 has a resistance of about 2.5 ohms, first part 23 has an inductance of about 50 microhenries, second part 24 has an inductance of about 70 microhenries, and FET switch 19 has an on resistance of about 0.3 ohms. In this embodiment, for a battery voltage of about 3.3 volts, battery current out 25 and switch current 28 are about 144 mA. LED drive current 26 and loop current 27 are about 209 mA. About 200 mW less power is consumed in an IrDA burst by this embodiment than by an IrDA/RC transceiver coupled to current limiting resistors as opposed to tapped inductor 12.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
    coupling an inductor to a light emitting diode (LED) of an IrDA transceiver, the inductor having a first lead, a tap and a second lead, the LED having an anode and a cathode, the tap of the inductor being coupled to the anode of the LED, the second lead of the inductor being directly coupled to the cathode of the LED, and wherein the IrDA transceiver comprises a switch; and
    turning the switch on to make the switch conductive such that a current flows through the LED from the anode to the cathode and then directly flows through the switch.

2. The method of claim 1, wherein the inductor has a first part and a second part, and wherein each of the first part and the second part is a trace on a printed circuit board.

3. The method of claim 1, wherein the IrDA transceiver comprises a switch, the method further comprising:
    controlling the switch such that the LED emits an IrDA transmission and such that the LED emits an RC transmission.

4. A circuit, comprising:
    an inductor having a first lead, a tap, and a second lead;
    a light emitting diode (LED) having an anode and a cathode, wherein the anode is coupled to the tap of the inductor, and wherein the cathode is directly coupled to the second lead of the inductor; and
    a switch having a drain, a source, and a control lead, wherein the drain is directly coupled to the cathode of the LED and to the second lead of the inductor.

5. The circuit of claim 1, wherein the first lead of the inductor is coupled to receive current from a power source, and wherein the source of the switch is coupled to ground potential.

6. The circuit of claim 1, wherein the LED and the switch are parts of an IrDA transceiver, the IrDA transceiver having a first terminal, a second terminal and a third terminal, the first terminal being coupled to the tap of the inductor, the second terminal being coupled to the second lead of the inductor, and the third terminal being coupled to ground potential.

7. The circuit of claim 1, wherein the switch is controlled such that the LED emits both an IrDA infrared transmission and an RC infrared transmission.

8. The circuit of claim 1, wherein the inductor is a toroidal inductor.

9. The circuit of claim 1, wherein the inductor has a first part and a second part, and wherein each of the first part and the second part is a trace on a printed circuit board.

10. The circuit of claim 1, wherein the inductor, the LED and the switch are parts of an IrDA transceiver.

11. The circuit of claim 1, wherein the circuit is part of a portable electronic device, the portable electronic device being taken from the group consisting of: a personal digital assistant (PDA), a cell phone, a portable MP3 player, a pager, a digital camera and a laptop computer.

12. The circuit of claim 1, wherein the LED is an infrared LED.

13. A method comprising:
    using an inductor to control a maximum amount of supply current supplied to a light emitting diode (LED), wherein the inductor has a first lead, a tap, and a second lead, wherein the LED has a first terminal and a second terminal, the first terminal of the LED being coupled to the tap of the inductor, the second terminal of the LED being directly coupled to the second lead of the inductor;
    sinking a first current from the second terminal of the LED for a first duration of time and thereby limiting the maximum amount of supply current flowing through the LED to a first amount;
    sinking a second current from the second terminal of the LED for a second duration of time and thereby limiting the maximum amount of supply current flowing through the LED to a second amount, wherein the first amount of time is shorter than the second amount of time, and wherein the first amount of supply current is smaller than the second amount of supply current; and
    wherein the LED emits a part of an IrDA transmission during the first duration of time, and wherein the LED emits a part of an RC transmission during the second duration of time.

14. The method of claim 13, wherein the maximum amount of current is determined at least in part by a duration of time that a current is sunk from the second terminal of the LED, wherein sinking the current from the second terminal for a longer duration of time causes the maximum amount of current to be larger, and wherein sinking the current from the second terminal for a shorter duration of time causes the maximum amount of current to be smaller.

* * * * *